United States Patent Office 3,659,006
Patented Apr. 25, 1972

3,659,006
SYNTHESIS OF α-HALOACRYLONITRILE
Kailash C. Pande, Parkersburg, W. Va., assignor to Borg-Warner Corporation, Chicago, Ill.
No Drawing. Filed June 17, 1969, Ser. No. 834,151
Int. Cl. C07c 121/30
U.S. Cl. 260—465.7                                    1 Claim

ABSTRACT OF THE DISCLOSURE

A method of preparing α-haloacrylonitriles from α,α,β-trihalopropionitriles comprising the step of adding a dehalogenating agent selected from the group of a trialkyl phosphite and a trihydrocarbylphosphine at a temperature of from 0–60° C.

BACKGROUND OF INVENTION

Prior to the instant invention, a great many methods were provided for the production of unsaturated aliphatic halonitriles, perhaps the most prevalent method of preparing monohaloacrylonitrile was by the dehydrohalogenation of saturated halogenated (chlorinated or brominated) nitriles containing 3 to 8 carbon atoms in the molecule. One of the primary difficulties of dehydrohalogenation prior to this invention was the requirement of high temperatures and relatively uneconomical catalysts with particularly complex reactions that resulted in relatively uneconomical processes. Also, many of the previous reactions provided a series of halogenated compounds which were somewhat difficult to separate to obtain the desired end product.

An example of prior art methods of preparing α-haloacrylonitrile from dechlorination of α,α,β-trichloropropionitrile is set forth in U.S. Pat. 2,384,889 wherein the dehalogenation is conducted at temperatures between 100–200° C., in addition to the high temperature used, the yields are relatively low, i.e., in the order of 40%. In this specific dehalogenation method, a magnesium complex is used and the dehalogenation is carried out in the presence of a solid.

SUMMARY OF INVENTION

The instant invention is directed to the preparation of α-haloacrylonitrile by the dehalogenation of α,α,β-trihalopropionitrile. The α,α,β-trihalopropionitrile is prepared by bubbling a halogen such as fluorine, bromine or chlorine through acrylonitrile at approximately room temperature. Under normal room temperature conditions, an excellent yield of trihalopropionitrile is obtained. The dehalogenation of the α,α,β-trihalopropionitrile is conducted by adding a trialkyl phosphite $(OR)_3P$ with R equal to an alkyl group containing from 1 to 10 carbon atoms or trihydrocarbylphosphine $(R')_2P$ with R' selected from the group $C_1$–$C_{10}$ alkyl and $C_6$–$C_{12}$ aryl. The reaction with trialkyl phosphite takes place at a temperature of 0–60° C. and the conversion is almost quantitative following the reaction sequence.

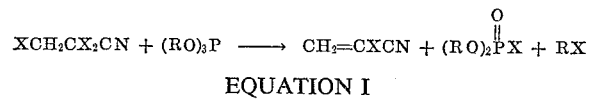

EQUATION I wherein R is an alkyl group containing 1–10 carbon atoms and X is fluorine, chlorine or bromine.

The process set forth in the equation may be further modified to α,β-brominated, chlorinated propionitrile using the following equations:

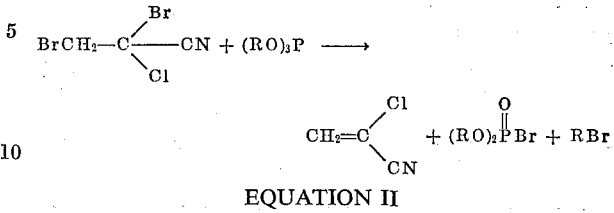

EQUATION II

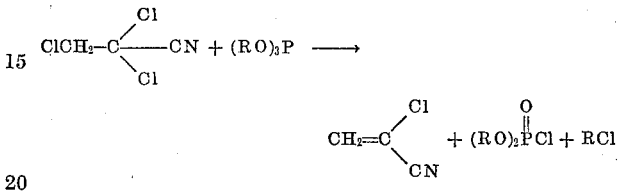

EQUATION III

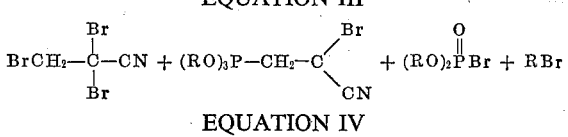

EQUATION IV

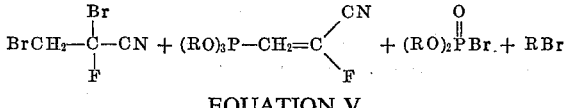

EQUATION V

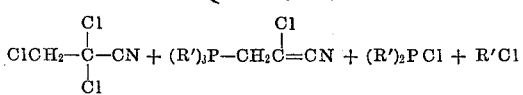

EQUATION VI

The reaction of this invention will be more clearly understood in view of the following examples wherein all parts are by weight unless otherwise indicated.

Example 1

52.5 g. α,α,β-trichloropropionitrile was charged to a three-necked flask equipped with a magnetic stirrer, condenser and a dropping funnel. 50 g. of triethyl phosphite was added to the flask in a dropwise manner. An exothermic reaction occurred and the temperature was held between 5–35° C. by external cooling. After addition of the phosphite, the reaction was maintained at room temperature for an additional half-hour. The majority of the ethyl chloride was evaporated off and the mixture was heated. About 3 g. of a low boiling fraction (33° C.) was collected. After the low boiling fraction was discarded, the main fraction contained in excess of 95% α-chloroacrylonitrile (about 26.5 g. with a yield of about 98%). The α-chloroacrylonitrile had a B.P. 83–95° C. Prolonged fractionation of the mixture at reduced pressure yielded O,O-diethylchlorophosphate (26.6 g. having a B.P. of 50°/1 mm. Hg). The α-chloroacrylonitrile was further characterized by its retention time in VPC, IR and NMR spectra.

Example 2

The reaction conditions of Example 1 were repeated and instead of adding triethyl phosphite, 1 mole of trimethyl phosphite was added to α,α,β-trichloropropionitrile at 10–25° C. α-chloroacrylonitrile in a yield of about 90% was obtained.

Example 3

Using the reaction conditions of Example 1, 12 g. of trimethyl phosphite was added dropwise to 30 g. of α,α,β-tribromopropionitrile. The temperature rose from 25–45° C. and after complete addition of the phosphite, the reaction mixture was kept at 50° C. for an additional one-half hour. Fractionation of the reaction mixture yielded 70% of α-bromoacrylonitrile with the B.P. of 52–53°/85 mm. The product was further identified by IR and NMR spectra.

Example 4

Using the reaction conditions of Example 1, 13 g. of triethyl phosphite was added to 32 g. of α,β-dibromo-α-chloropropionitrile. The temperature was maintained between 20° C. and 40° C. After the complete addition of the phosphite, the reaction mixture was fractionated to yield α-chloroacrylonitrile (85% yield, B.P. 82–85° C.).

Example 5

Using the reaction conditions set forth in Example 1, 30 g. of α,α,β-tribromopropionitrile and α-fluoro-α,β-dibromopropionitrile in the ratio of 60:40 was placed in a reaction flask. 15 g. of trimethyl phosphite was added to the flask and after complete addition, the reactant mixture was kept at 45° C. for 15 minutes. The fraction yielded α-fluoroacrylonitrile (3.0 g.) with a B.P. of 39–42° C. and of α-bromoacrylonitrile (7.5 g.) B.P. 56–59° C./98 mm.

Example 6

To an ether solution of α,α,β-trichloropropionitrile (26.0 g. in 75 ml. of ether) was added an ether solution of triphenylphosphine (16.0 g. in 100 ml. ether). An exothermic reaction occurred, immediate precipitate of triphenylphosphorus dichloride was formed. This was filtered, the filtrate on analysis on VPC gave about 60% yield of α-chloroacrylonitrile.

Example 7

To an ether solution of α,α,β-trichloropropionitrile (26.0 g. in 75 ml. of ether) was added an ether solution of tri-n-butylphosphine (25.0 g.). An exothermic reaction occurred and an immediate precipitate formed. After filtration, the filtrate was fractionated giving about 60% yield of α-chloroacrylonitrile.

The aforementioned examples have illustrated the preparation of α-haloacrylonitrile through the dehalogenation of α,α,β-trihalopropionitrile. It will be understood that the invention has been described in connection with certain specific embodiments thereof and this is by way of illustration only and not by way of limitation and that the scope of the invention is defined solely by the appended claim which should be construed as broadly as is consistent with the prior art.

I claim:

1. A method of preparing α-haloacrylonitriles selected from the group consisting of alpha-fluoro, alpha-bromo and alphachloroacrylonitrile from their corresponding alpha-alpha-beta-trihalopropionitrile comprising the step of dehalogenating the corresponding trihalopropionitrile through the addition of a dehalogenating agent, said dehalogenating agent selected from the group consisting of trialkylphosphite, wherein the alkyl group contains 1–10 carbon atoms, trialkylphosphine wherein the alkyl group contains 1–10 carbon atoms and triarylphosphine, wherein the aryl group contains 6–12 carbon atoms, and wherein the reaction takes place at a temperature of 0–60° C.

References Cited

UNITED STATES PATENTS

| | | | |
|---|---|---|---|
| 2,385,550 | 9/1945 | Spence | 260—465.7 |
| 3,361,786 | 1/1968 | Fink | 260—465.7 |
| 3,527,787 | 9/1970 | Baader et al. | 260—465.9 |

JOSEPH P. BRUST, Primary Examiner

U.S. Cl. X.R.

260—960